July 12, 1949.  C. M. TUTTLE ET AL  2,476,007
FILM PROCESSING APPARATUS
Filed June 19, 1945 6 Sheets-Sheet 2

CLIFTON M. TUTTLE
CHARLES J. KUNZ
INVENTORS

BY
ATTORNEYS

July 12, 1949.  C. M. TUTTLE ET AL  2,476,007
FILM PROCESSING APPARATUS
Filed June 19, 1945  6 Sheets-Sheet 4

CLIFTON M. TUTTLE
CHARLES J. KUNZ
INVENTORS

BY
ATTORNEYS

July 12, 1949.  C. M. TUTTLE ET AL  2,476,007

FILM PROCESSING APPARATUS

Filed June 19, 1945  6 Sheets-Sheet 5

CLIFTON M. TUTTLE
CHARLES J. KUNZ
INVENTORS

BY
ATTORNEYS

July 12, 1949.    C. M. TUTTLE ET AL    2,476,007
FILM PROCESSING APPARATUS
Filed June 19, 1945    6 Sheets-Sheet 6

CLIFTON M. TUTTLE
CHARLES J. KUNZ
INVENTORS.

BY
ATTORNEYS

Patented July 12, 1949

2,476,007

UNITED STATES PATENT OFFICE 2,476,007

FILM PROCESSING APPARATUS

Clifton M. Tuttle and Charles J. Kunz, Rochester, N. Y., assignors to Eastman Kodak Company, Rochester, N. Y., a corporation of New Jersey Application June 19, 1945, Serial No. 600,251

13 Claims. (Cl. 95—89)

1

The present invention relates to photography, and particularly to apparatus for processing an exposed light-sensitive film in a very rapid manner.

For disclosure purposes, the present invention is shown in conjunction with the photographic recording apparatus disclosed and claimed in copending patent application Serial Number 600,250 filed on even date herewith, now U. S. Patent 2,446,668, issued August 10, 1948, and in which we are co-inventors, the present invention constituting a very important part of said apparatus. Although this recording apparatus was developed specifically for recording the radar images as they appear on the cathode ray screen of a radar receiver, it will be apparent that the present invention is not limited to use in connection with such a recording apparatus, but is capable of a use independent of such a recording apparatus or with other types of such apparatus.

In using radar to detect the approach of distant objects a beam of signals is sent out from the antennae of a transmitter and if this beam is intercepted by an object it is reflected back toward the source and is picked up by a receiver which includes a cathode ray tube on which the received signal appears as a bright spot of light. In one radar application the transmitting antennae is constantly rotated at a fixed rate through 360 degrees in azimuth, one rotation being referred to as a "sweep," and one sweep of the antenna makes one revolution or sweep of the cathode ray tube of the receiver. If during a sweep of the antenna an object is picked up, a bright spot will appear on the cathode ray tube indicating the presence of the object. The cathode ray tube has a grid made up of concentric circles and radial lines placed thereon, generally electronically, and by plotting the point at which an object appears on this tube by the use of this grid, the direction and range of the object can be determined.

Inasmuch as these cathode ray tubes are limited in size and the image appearing thereon is rather small, and the sweep of the tube is fairly fast, it has been found that it is impossible for one person to view and take the information off of but a limited sector of the complete tube surface. For this reason it has been common practice to provide as many as ten or twelve cathode ray tubes on a single receiver which will each show the signal picked up, and to have an observer for each tube. Each observer has only a limited section of the tube face which he has to watch, and when an observer sees an image

2 appear in his section he ascertains the location of the same as to the grid lines on the tube and relays this information to a group of plotters who then proceed to plot the object on a large plotting board which is an enlarged duplication of the grid on the face of the cathode ray tube.

It was decided that if it were possible to photograph the surface of the cathode ray tube, process the film and project the image of the tube onto a large screen, 7 feet by 7 feet, that only one cathode ray tube would be required and all this duplicate equipment and the personnel necessary to man it would be eliminated. To be of any use, such an apparatus had to be able to photograph a complete sweep of the tube and project the image onto the screen almost instantly, otherwise, the object being tracked would move over too great a distance during separate observations to make the system practical.

To this end, we have invented apparatus by means of which a complete sweep of the cathode ray tube of a radar receiver can be photographed on a 16-mm. film, the exposed film processed in less than 15 seconds, and the processed image projected, enlarged approximately 360 times, onto a screen for observation. The complete cycle from the beginning of the exposure to the time the image is projected onto a screen takes slightly less than 30 seconds, 15 seconds of which is consumed by the time of exposure which is controlled by the sweep time of the radar equipment which is used. The apparatus is completely automatic in operation so that the number of persons required to operate it is reduced to a minimum.

One object of the present invention is to provide apparatus by the use of which an exposed area of a light-sensitive film can be processed in a very rapid manner, actually less than 15 seconds.

Another object is to provide an apparatus for processing the exposed area of a film which makes use of hot processing solutions to speed up the processing time, and in which small measured quantities of different processing solutions are successively placed on, and removed from, the exposed area of film.

Another object is to heat the solutions immediately prior to the use thereof so that they suffer no decomposition prior to their use which is deleterious to their function.

And yet another object is to provide an apparatus which is particularly adapted for carrying out the specified method of processing for the reason that it permits very close control of the application, timing and removal of the processing solutions relative to the film which is necessary for obtaining reproducible results when using hot processing solutions and accelerated processing times resulting therefrom.

And still another object is to provide a processing apparatus of the type set forth which is particularly adapted for automatic operation and association with a recording apparatus of the type with which it is shown in combination.

And another object is to provide a processing apparatus of the type set forth which is very efficient in operation despite the fact that it is comparatively rugged and simple in construction.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings in which.

Like reference characters refer to corresponding parts throughout the specifications and drawings.

Figure 1:
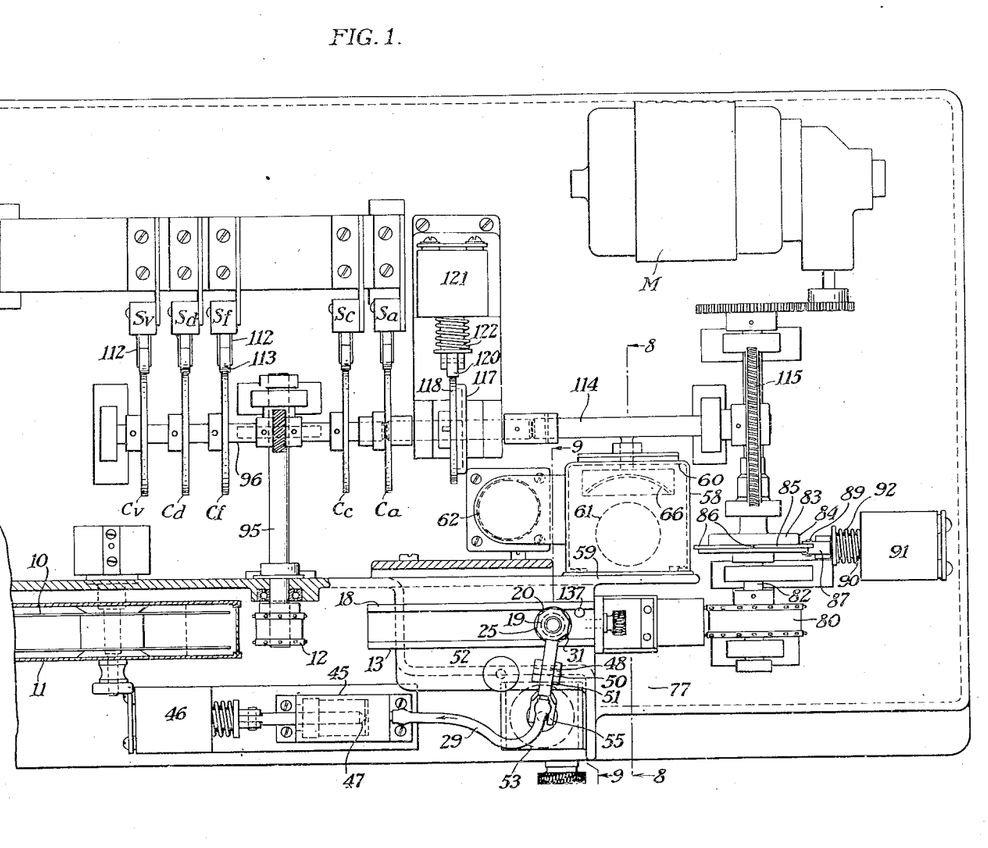
Fig. 1 is a top plan view showing a preferred embodiment of the complete apparatus.
Figure 7:
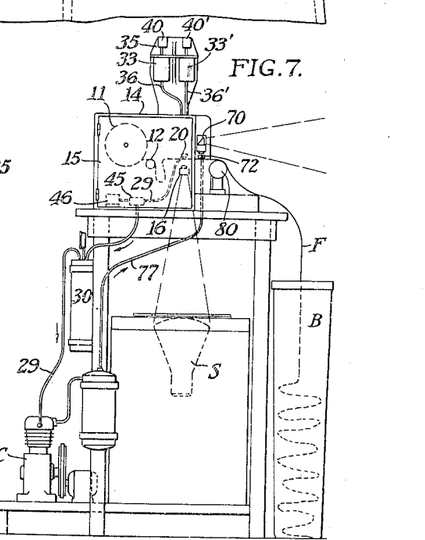
Fig. 7 is a side elevational view showing the apparatus as actually set up for use in photographing the cathode ray tube of a radar receiver.

Referring to Figs. 1 and 7, a 16-mm. perforated film F is fed from a supply reel 10 in a light-tight film retort 11 over a sprocket 12 into a film track 13, emulsion side up, to an exposing station and processing station. The film retort and the exposure and processing stations are enclosed in a light-tight housing 14, one wall of which, see Figs. 5 and 7, may constitute a door 15 to permit access to the interior of the housing for threading the film through the apparatus.

At the exposure station the film is positioned above an objective lens 16 which is screwed into the bottom wall of the housing 14. The lens is focused on the radar screen, or cathode ray tube, shown at S in Fig. 7, and forms an image of the screen surface through the transparent film base and onto the emulsion surface of the film. As clearly shown in Figs. 2 and 4, the film track 13 may comprise a lower plate 17 having a longitudinal groove therein slightly deeper than the thickness of the film, and precisely the width of the film to confine the latter against lateral shift, said plate having a cover plate 18 lying on top thereof to form a tunnel for the film. The lower plate 17 of the track is provided with an exposure aperture 19 covered by a glass plate 19', see Figs. 2 and 10, through which the image of the screen passes to the film.

The processing of the exposed area of the film is adapted to commence immediately after the exposure is completed and without moving the film from the exposure station. To do this, the processing means, which will be fully described hereinafter, includes an open-ended processing cup 20, best shown in Fig. 10, which is adapted to move into and out of liquid tight engagement with the emulsion surface of the film through a hole 21 in the cover plate 18 of the film track. This cup is disposed directly above the exposure lens and is of such a size and shape as to encircle the area of the emulsion surface which has been exposed. After the cup has been moved into engagement with the film, and the exposed emulsion surface of the film constitutes a liquid-tight bottom for the cup, small measured quantities of two different processing solutions are successively introduced into the cup and removed therefrom and from the film surface, being allowed to remain in the cup for a given time necessary to accomplish the processing of the film.

After the exposed area of the film has been processed and the last solution used has been completely removed from the film surface, the cup is automatically raised from engagement with the film, and then a film feeding means, including a quarter-turn sprocket 80, is automatically released to feed the film by an amount sufficient to advance said exposed and processed area of film into a projecting means where the image is projected approximately 360 times magnified onto a suitable viewing screen, not shown. The procedure is a continuous one so that any one image area remains in the projector during the time a successive area is being exposed and processed, and is then moved on to a suitable take-up means, shown as a box B in Fig. 7, by the advance of the next image into the projector gate.

With the present apparatus it takes approximately 13.5 seconds to process an exposed area of film so that if it be assumed that the sweep time of the radar screen is 15 seconds, as it is in certain applications, and this is the exposure time, then it takes 28.5 seconds to make an exposure and process it for projection, and a successive image is projected every 28.5 seconds. The time of the cycle is extended by the long exposure period, and it is pointed out that in applications of this apparatus where instantaneous exposures are possible, then the picture could be taken and could be projected substantially in 13.5 seconds overall time.

Having generally outlined the purpose and function of the apparatus, we will now consider the details of several features of the apparatus and their relationship to one another which renders the apparatus entirely automatic in operation.

*Exposing means*

The film exposing means of the embodiment of the apparatus designed for use with radar is very simple and simply comprises the objective lens 16 and the apertured film track which serves to hold the film flat in the focal plane of the lens. No shutter is required, but the lens is open all of the time, and the exposure time is determined by the time required in making one sweep of the radar screen and which in turn is dependent upon the sweep time of the transmitting antenna of the radar transmitter. The radar screen has the desired grid electronically impressed thereon at all times and a bright spot appears on the screen only when an object intercepts the transmitted radar beam and reflects it back to the receiver. The rotation of the spot on the grid of the screen permits the direction and range of the object to be calculated. Inasmuch as the lens is open at all times, the second exposure of an area of film is made while the one previously made is being processed, but since the instant the developing solution strikes the emulsion surface, which is practically the instant the exposure is completed, the sensitivity of the surface to light is greatly reduced, this second exposure has little or no deleterious effect on the exposure which was first made and is being processed. As will be pointed out hereinafter, if it were desired, or necessary, in certain applications of the apparatus other than in recording radar images, a shutter, or equivalent exposure determining means, could be used. In such a case, the shutter would be open just so long as necessary to make the exposure and could be closed during the processing step to preclude the danger of double-exposure possibilities. If a shutter were used, then the processing operation would be instigated in timed relation to the operation of the shutter. The shutter would be opened at a time when a fresh area of film is moved into its exposing position and/or when a new scene or copy, which is to be photographed comes into the field of the lens. Such a modification will be discussed more in detail below.

*Processing means*

The processing means may be truly referred to as the heart of the complete recording apparatus because it makes possible the processing of the film immediately after exposure and in a very short time, and constitutes the present invention. It is well known that most processing solutions operate much more rapidly at elevated temperatures. However, a limit is placed on the temperature which can be used by the rate of decomposition of the solution—that is, they can be greatly elevated in temperature for only short periods before the exposure. Since most commonly used processing methods entail heating the whole, or a substantial part of the processing bath, the temperatures which can be practically tolerated are sometimes limited. With the system of processing used in this equipment, only a very small quantity of the solution is used and then is discarded. It is, therefore, only necessary to heat that part of the chemical supply which is to be used immediately, and thus before decomposition becomes appreciable, the solution is used and discarded.

Processing operations are so much more accelerated at very high temperatures (130° to 200° F.), that, for reproducible results, close control must be exercised over the application, timing, and removal of the solutions. This is readily accomplished with the processing apparatus we have designed and which will now be discussed in detail.

Figures 8, 10, 11:
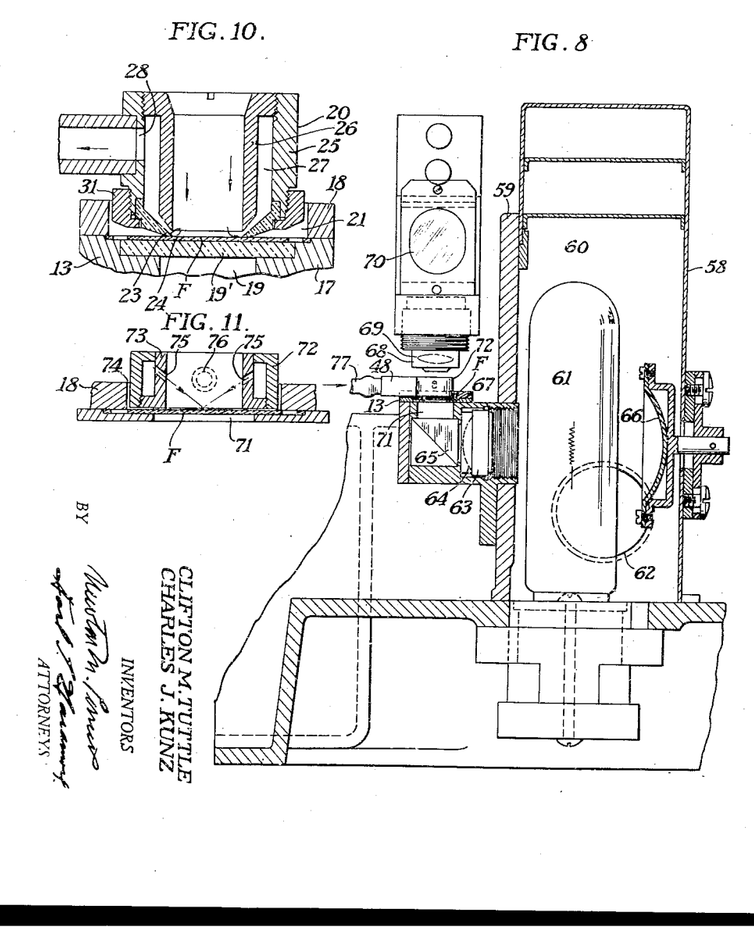
Fig. 8 is a sectional view taken substantially on line 8—8 of Fig. 1, and showing the projector system of the apparatus.
Fig. 10 is an enlarged vertical section of a preferred embodiment of the processing cup.
Fig. 11 is an enlarged vertical section taken across the film gate of the projector part of the apparatus and showing the means for cooling, drying, and flattening the film during the projection thereof.

Referring now particularly to Figs. 2, 3, 9, and 10, the processing means includes the processing cup 20, which, as best shown in Fig. 10, is open at both ends and is movable relative to the film track to move a lip 23 thereon into and out of liquid-tight engagement with the emulsion surface of the film. The cup is of such size and shape that the lip 23 encircles the area which has been exposed. When the cup is in its operative position it rests with its lip on the surface of the film and with its axis normal to that surface. Each of the processing solutions is run into the enclosed space through the open top of the cup and is subsequently removed by passing through the slit orifice 24 located close to the film surface. The action and position of the orifice is such that the surface of the film is left free of loose or superfluous liquid.

In its simplest form the processing cup consists of two concentric cylinders 25 and 26 with a space between them forming a chamber 27 which communicates with the interior of the cup through the orifice 24 and which is closed at the other end by the threaded connection between the two cylinders. At the open (the bottom end with the present disposition of the cup) end, the outer cylinder 25 rests on the emulsion surface of the film while the inner cylinder 26 is shorter so as to form the slit orifice 24. It goes without saying that the walls 25 and 26 of the cup could be integral rather than separate and threadedly connected together as shown, and that the orifice 24 could be formed therein by cutting through the inner wall at the location indicated without going beyond the scope of the present invention. However, we have found the illustrated and above-described method of fabricating this cup to be preferable from the practical standpoint. The outer cylinder is provided with a port 28 which is connected by a tube 29 to a source of vacuum or low pressure. In the present instance this source of vacuum is the low pressure side of a conventional motor driven compressor unit C shown in Fig. 7 and mounted on the floor next to a table on which the apparatus is supported vertically above the radar screen of a radar receiving unit. Then when vacuum is applied to chamber 27, any solution contained in the central portion of the cup will be drawn off through the slit orifice, into the chamber 27, and then into a waste liquid collecting container 30 connected in the vacuum line 29 ahead of the compressor.

It is desirable, however, to shape the bottom of the outer cylinder of the processing cup so that it presents a knife edge which rests flat against the surface of the film, as shown in Fig. 10. Thus no corners are present in which the liquid might collect and fail to be drawn off with the bulk of the solution. The action of the knife edge and orifice close to the film surface is to allow the air stream to skim the last trace of liquid radially off the film and then to more or less dry the enclosed film surface. It is further desirable that the knife edge and film contact surface of the lip 23 of the cup, which might be damaged, be simply replaceable. One way of accomplishing this is shown in Fig. 10 wherein the lip 23 is shown as a ring separate from the outer cylinder 25 and attached to the end thereof by a threaded retaining ring 31. In order to facilitate manufacture of the replaceable lip, and to reduce possible damage to film surfaces thereby, it has been found desirable to make the lip 23 of a plastic material (Lucite).

Small areas are completely cleared of liquid by simply applying a vacuum to the chamber 27 as described. Larger areas are cleared equally well, however, by directing one or more streams of air or other gas, under pressure at the center of the film area to move the liquid residue close enough to the orifice to permit its final removal by vacuum. Furthermore, positive pressure alone (without vacuum) can be used; however, depending on the dimensions of the unit, it may be necessary to close the top of the cup to maintain sufficient pressure and to prevent the solution from being blown about during removal.

Figure 15:
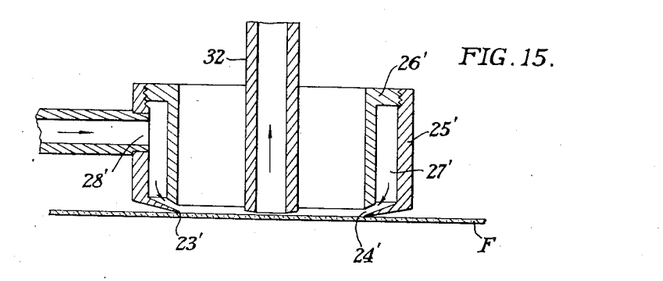
Fig. 15 is a vertical section showing another embodiment of film processing cup which could be used.

Another method of using this processing cup exists in which pressure is applied in the opposite direction to that already described, causing the air, or other gas, to skim the surface of the enclosed space radially from the edge to the center. In this case it is first necessary to remove the bulk of the solution by vacuum through another orifice close to the film, located at the point of convergence of the air from the surrounding slit orifice. Then the residue adhering to the surface is moved radially by the air from the surrounding slit orifice to the area which is cleared by the vacuum orifice. Such a modification of the invention is shown in Fig. 15 wherein is shown a cup composed of two concentric cylinders 25' and 26' threaded together at one end and having an annular chamber 27' between them communicating with the interior of the cup through a slit orifice 24'. It will be noticed that the film engaging lip 23' in this instance is formed integral with the outer cylinder instead of being a part separate therefrom as in the preferred embodiment. In this case, the port 28' is adapted to be connected with a source of high pressure, and disposed in the center of the cup is a conduit 32 which is adapted to be connected with the source of vacuum. As shown, the end of the conduit 32 is close to the area of the film surface embraced by the cup during periods of evacuation, but can be moved away from the film with the cup during periods of film movement, or it can be individually moved from the film during processing.

Processing solutions are stored in reservoirs disposed above the processing cup, and small measured quantities thereof are introduced into the open end of the cup in timed relation through tubes after being heated to a high temperature. In the present instance, the processing of the exposed film is carried out by first introducing the developing solution to the cup, allowing it to remain there for a given interval, evacuating the cup, then applying a fixing solution to the cup, allowing it to remain there for a given time, evacuating the cup, then rinsing with the developer solution, and finally evacuating the cup prior to movement of the film to the projecting means.

Figures 2, 3, 4:
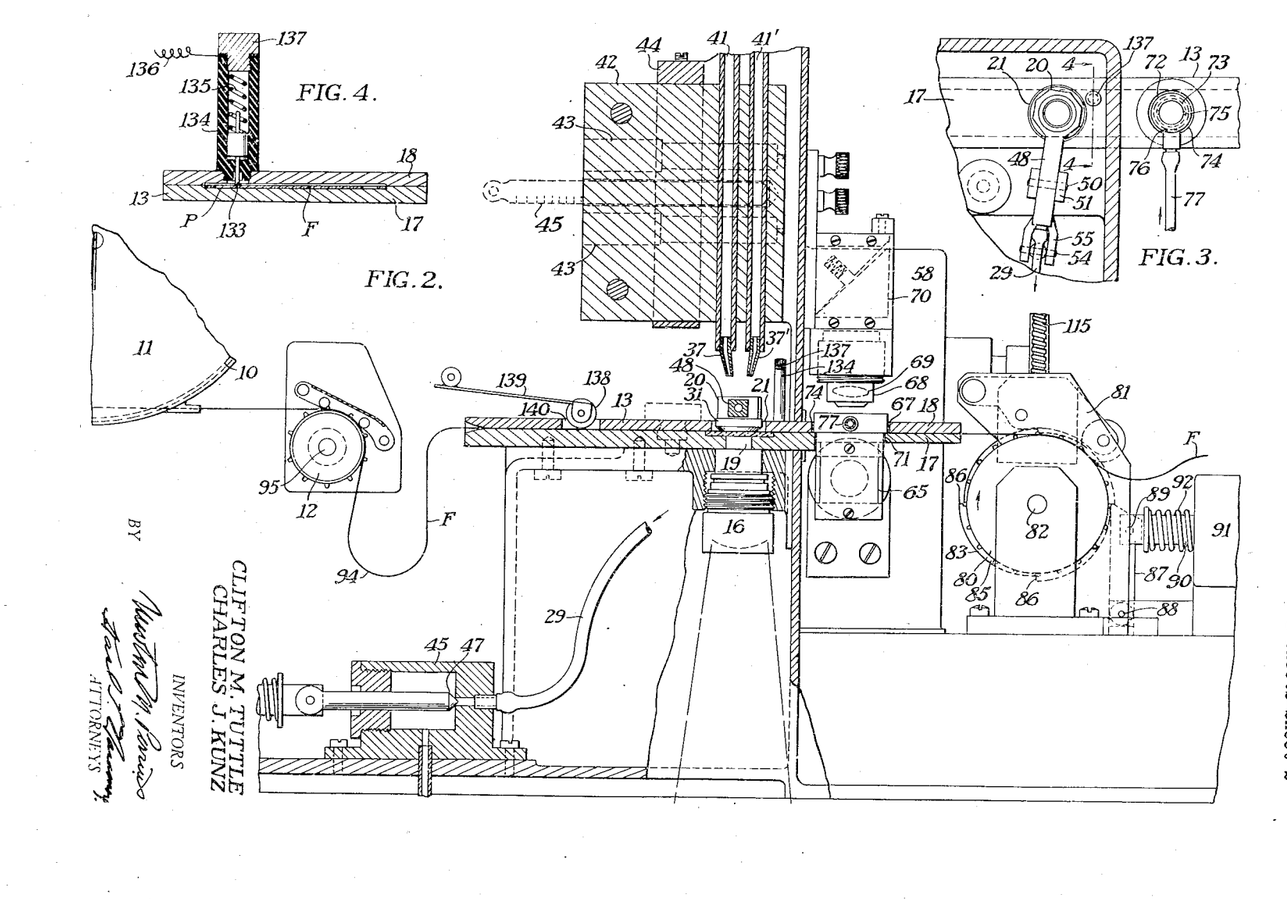
Fig. 2 is a partial side view of the apparatus, partly in section and partly in elevation, with the side removed, and showing the film path through the apparatus.
Fig. 3 is a partial plan view looking down on the top of the processing cup and a portion of the film track there-adjacent.
Fig. 4 is an enlarged sectional view taken substantially on lines 4—4 of Fig. 3 and showing the flood switch.
Figure 6:
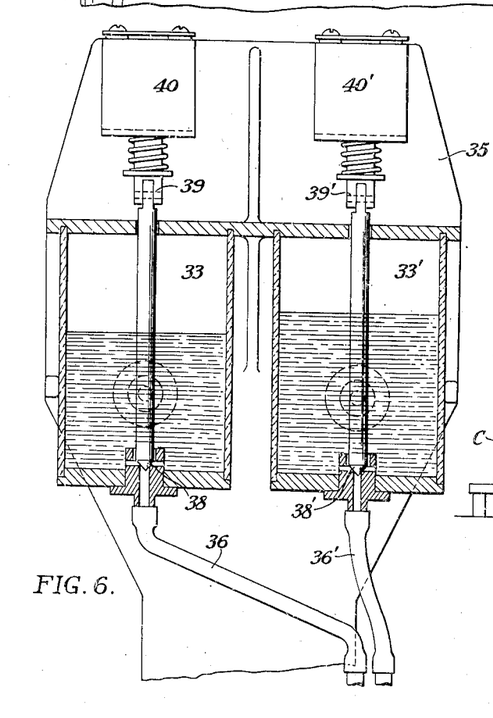
Fig. 6 is an enlarged detail, partly in section, showing the reservoirs for the processing solutions and the valve mechanism for controlling the flow of measured quantities of the solutions into the processing cup.
Figure 9:
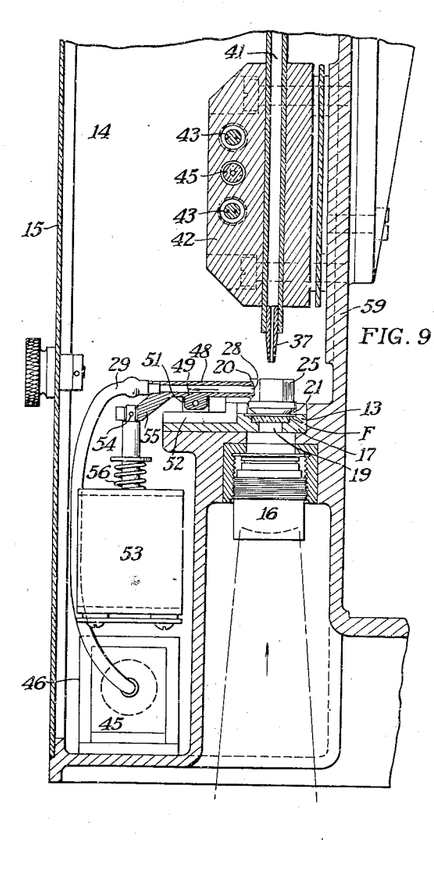
Fig. 9 is a sectional view taken substantially on line 9—9 of Fig. 1, and showing the manner of lifting the processing cup prior to movement of the film.

Accordingly, referring to Figs. 2, 6, and 9, the processing apparatus includes two identical reservoirs 33 and 33' for storing developer and fixing solutions, respectively, and which reservoirs are mounted above the processing cup on a vertical needles of which extend through the top of the housing 14. The solutions are adapted to be fed from the respective reservoirs to the processing cup by conduits 36 and 36' which terminate in jets 37 and 37' disposed adjacent to and above the top open end of the cup. Flow of the respective solutions from their reservoirs into the conduits is controlled by needle valves 38 and 38', the needles of which extend through the top of the reservoirs and are pivotally connected at 39 and 39' to the plungers of solenoids 40 and 40', respectively. The compression springs acting on the plungers of the solenoids act to normally close these valves. Each of the needle valves is opened by energization of the solenoids and the duration and extent of opening of the valves control the amount of solution allowed to flow into the conduits and, subsequently, the amount of flow into the processing cup.

To provide for heating only the small quantity of processing solution needed for a processing step, and immediately prior to using them, the following means has been designed. Each of the conduits 36 and 36' includes a metal section 41, 41', or other heat conducting material, which is imbedded in a metal block or heat exchanger 42. This block is heated by electric-rod heaters, indicated at 43, and maintained at a predetermined temperature (approximately 170° F.) by means of a thermostatic regulator 44. A thermometer 45 may be imbedded in the block to indicate the temperature thereof. For processing purposes, only about one-third cc. of the processing solutions are introduced into the cup at a time, and the size of the metal sections 41, 41' of the conduit is such that they will contain just a slightly greater volume of solution than is used for any processing step. It is pointed out that if desired the block 42 could be made of stainless steel, or other material inert to processing solutions, and then the solution can be piped directly into and out of bores in the block thus eliminating the use of the metal sections 41, 41' of the solution conduits.

After each solution has remained on the film surface for a given time to accomplish its chemical action, and before introducing the other solution into the cup, or before advancing the processed film to the projecting means, the cup is evacuated and the film surface is freed of all superfluous liquid by vacuum in the manner to be described. As mentioned above, the port 28 of the processing cup 20 is connected to the low pressure side of a compressor unit by a vacuum line 29. This line includes a normally closed needle valve 47, mounted on the base of the housing 14, and which valve is adapted to be opened by a solenoid 46, see Figs. 1 and 2, the plunger of which is pivotally connected to the needle 47 of the valve. Thus the cup 20 will be connected to the vacuum supply only when the solenoid 46 is energized. The solenoids 40, 40' and 46 are automatically operated in times relation by a timing means to be later described.

After an exposed area of film is completely processed it is directly moved into the projecting means, but, to prevent the film surface and the lip of the cup from being damaged, the cup and film must be separated prior to and during the film movement. While this step could be readily accomplished by moving the film relative to the cup, or by moving both of them relative to each other, we have found it particularly adapted to the present application of the apparatus to move the cup to and from the film which is held against lateral movement by the film track.

To this end, the cup 20 proper is mounted on the end of an elongated square tube 48 which is connected to the port 28 thereof and which forms a part of the vacuum line, see Figs. 3 and 9. Extending from the bottom of this tube 48 is a lug 49 having pins 50 extending from both sides thereof. These pins 50 are rotatably mounted in spaced bearing blocks 51 mounted on the top of an extension 52 of the film track 13 so that the cup is pivotally supported to move to and from the film surface. Movement of the cup from the film is effected when a solenoid 53 is energized, the plunger of the solenoid being pivotally connected at 54 to an arm 55 extending from the lower side of the tube at the end thereof opposite the cup 20. The compression spring 56 acting on the plunger of the solenoid acts to normally move the cup 20 into its film engaging position. Thus, after the last processing solution is evacuated from the cup and before the film is advanced to the projecting means, the solenoid 53 is energized to raise the cup from the film surface, and this is accomplished automatically in proper timed relation to the steps mentioned by the timing circuit to be later described.

Projection means

After the exposed area of the film is processed, it is immediately advanced into projecting position in a projection apparatus, while at the same time a fresh area of the film is moved into position for exposure and processing, and these steps go on while the previously processed area is being projected onto a suitable screen. Referring to Figs. 2 and 8, the projection apparatus includes a lamp-house 58 mounted on an extension 59 of the side wall of the housing 14 so that it is located outside of the housing and to one side of the end wall 60 thereof. In this lamphouse there is positioned a lamp 61 whose filament is located below the plane of the film track. Air from a blower, not shown, is adapted to be directed into the lamphouse through a line, a part of which is shown at 62, to ventilate the lamphouse and cool the condenser lens.

Fixed in the vertical wall of the lamphouse at a point below the film gate, and in alignment with the lamp filament, there is a mount 63 containing a suitable condenser system 64 and a deviating prism 65 which in combination with the reflector 66 in the lamphouse form an optical system for uniformly illuminating the aperture of the film gate 67. A second optical mount 68 is fixed to the end wall of the housing 14 above the film gate, and this mount includes a suitable projection lens system 69 and a deviating prism 70 which in turn form an enlarged image of the film area in the gate and project it forwardly onto a suitable receiving screen, not shown.

Inasmuch as a relatively bright source of illumination is needed to project an image of the magnification desired, along with the fact that the exposed area of film remains in projecting position for a comparatively long time, means must be provided for supporting the film at the gate to prevent it from catching fire or being otherwise damaged by the intense heat. Furthermore, if the film moving into the film gate is still damp, considering that the emulsion has absorbed a certain amount of the processing solutions which cannot be removed by vacuum in the processing cup, it is desirable to completely dry the film at this point before storing it. To this end a novel film gate structure has been provided by the use of which these two desired results, as well as others that we mentioned, are obtained.

Referring now to Figs. 2, 8, and 11, the film gate of the projecting apparatus comprises a part of the film track 13 which extends through the end wall 60 of the housing 14 and which may be light trapped in any suitable manner, such as by means of felt strips, to prevent light leaking into the housing to fog the unexposed film therein. The lower plate 17 of the film track is provided with a projection aperture 71 over which the exposed area of film is to be positioned for projection, the top surface of said plate defining the projection plane for the film and thus forming the rear member of the film gate. The front member of the film gate consists of an open-ended chamber formed by two concentric rings 72 and 73 fastened together in a manner such that a closed space is provided between the vertical walls thereof. This chamber is located so that its axis is normal to the film plane, and the lower end thereof extends through a hole 74 in the top plate 18 of the film track and is spaced a slight distance from the emulsion surface of the film. The chamber is of such a size and shape as to encircle and mask the area of the film to be projected.

Two small drill holes 75 through the wall of the inner cylinder, spaced 180 degrees from one another, form orifices which communicate with the top of the enclosed space. These are directed downwardly at an angle so that their center lines intersect in, or slightly above, the plane of the bottom of the chamber, see Fig. 11. The outer ring 72 of the chamber is provided with a port 76 at a point 90 degrees from either orifice and which is connected to the high pressure side of the compressor feed by a line 77, see Fig. 7. Thus air under pressure entering the chamber is symmetrically distributed and issues from the orifices in intersecting streams so that the resultant of the combined streams is downward, substantially normal to the film surface. The film gate design, therefore, accomplishes the following combination of effects: Air is delivered to the surface of the film for cooling during prolonged periods of projection; successful dissipation of heat results in ultra-rapid drying of the film, which reaches the projection apparatus while wet or damp; the film is pressed flat against the aperture plate of the gate by air pressure, thus obtaining a constant and repeatable film plane; dirt or oil from the compressor is blown away from the area of interest—that is, radially from the center to the edge of the area concerned; and all of these effects are obtained under space limitations (lens directly above and close to film plane) which makes the use of a single jet, normal to the surface of the film plane, impossible.

Film feeding means

The apparatus includes means for advancing the film strip from the supply roll and through each of the exposing, processing, and projecting stations in succession in an intermittent, or step-wise, fashion, so that at each feeding operation a fresh area of film is moved into position for exposure and processing, and the area previously processed is moved directly into the film gate of the projection means. The dwells of the film feeding means are such as to allow the film to remain stationary long enough to effect the exposure and the processing step, and the operation of the film feeding means is automatic and in timed relation to the exposure and processing steps.

Figure 5:
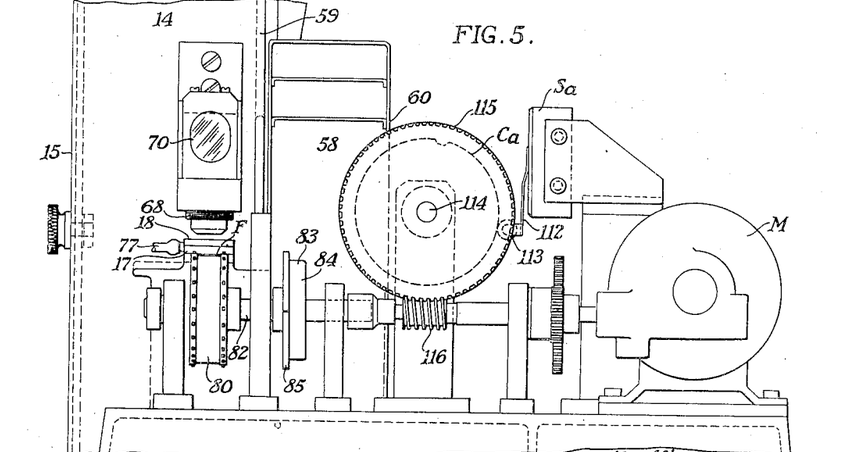
Fig. 5 is an end view of the apparatus shown in Fig. 1 and looking from the right-hand end of Fig. 1 or into the projector beam.

Referring now to Figs. 1, 2, and 5 the film feeding means includes a relatively large driving sprocket 80 the teeth of which are adapted to engage the film perforations. The film is adapted to be held in driving engagement with the sprocket by means of a conventional spring-pressed guide roller assembly 81. The drive for this sprocket comprises a constant speed electric motor M which is geared to a drive shaft 82 and a one-quarter turn clutch 83 between the drive shaft and the sprocket. As well known, this type of clutch includes a driving member and a driven member which are connected together so that so long as the driven member is held against rotation the driven and driving members are disconnected from one another, but when the driven member is released, the two are immediately connected in driving relation. Rather than the clutch being of the well-known friction type, we prefer to use a positive engaging clutch such as those used on punch presses, or such as those including balls which are mounted in a cam slot in one clutch member and normally spring pressed into wedging position between the clutch members.

The clutch 83, therefore, includes a driving member 84 and a driven member 85 each positively fixed to the drive shaft and sprocket, respectively. There are four ratchet teeth 86 extending from the periphery of the driven member and disposed in quadrant relation thereon. A pawl 87 pivoted at 88 on the base plate of the apparatus is adapted to move into and out of the path of the ratchet teeth 86, and when it engages a tooth it positively holds the driven member of the clutch and the sprocket and disconnects the sprocket 80 from the drive shaft. The free end of the pawl is pivoted at 89 to the plunger 90 of a solenoid 91, the spring 92 of which normally moves the pawl into contact with the periphery of the driven member and consequently into the path of the ratchet teeth. Accordingly when the solenoid is momentarily energized the pawl is moved from the path of the tooth with which it is in engagement and is allowed then to return to its normal position to stop the sprocket after a quarter revolution. The diameter of the sprocket 80 is such that a quarter revolution thereof serves to advance an exposed area of film from the processing station into the film gate of the projector.

Rather than have the sprocket 80 pull the film directly from the supply roll 10, we have found that the tension of the film can be reduced if the film is pulled from the supply reel by the supplementary sprocket 12 mounted between the retort 11 and the end of the film track. The purpose of this sprocket is merely to feed the film from the retort into a supply loop 94 and from which the drive sprocket 80 pulls it. The sprocket 93 is fixed on a shaft 95 which is in turn geared to a single revolution cam shaft 96, to be described later, so that the speed of this sprocket is sufficient to maintain the film loop.

*Control circuit*

Figure 12:
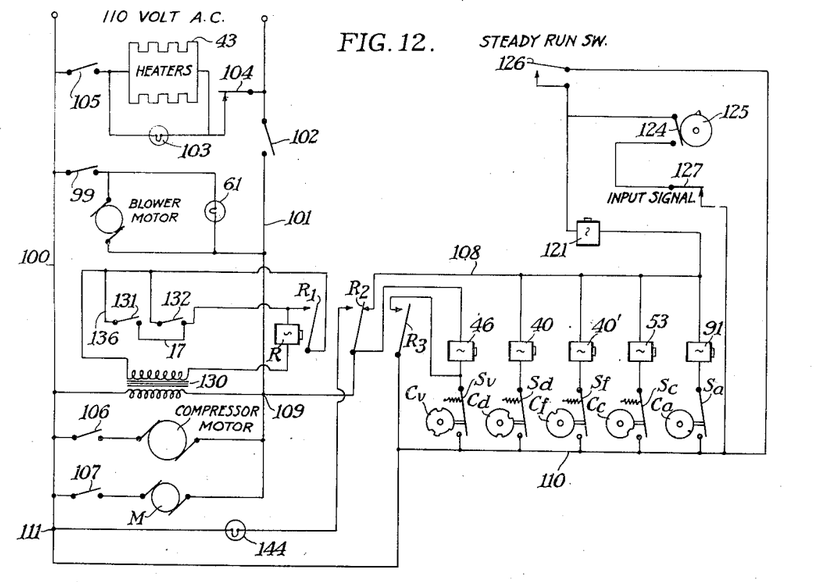
Fig. 12 is a diagrammatic showing of the control circuit for the apparatus.

In order to make this apparatus automatic in operation, even to the taking of successive exposures and processing them, the following control circuit has been designed. Referring to Figs. 1, 5, and 12, the control circuit includes main lines 100 and 101 which are adapted to be connected to a 110-volt A. C. source of power, and which circuit is controlled by a manual switch 102. The rod heaters 43 and a pilot lamp 103 parallel therewith are connected across lines 100 and 101 with switch 104 of the thermostatic regulator 44 in series therewith. The heaters can be turned on independently of the rest of the apparatus to bring the block 42 up to temperature by closing switch 105. The pilot lamp is provided to indicate to the operator that the heaters are on, and when the light flashes on and off it is an indication that the steel block is up to temperature and the apparatus can be used. Also connected across the lines 100 and 101 are the blower motor for ventilating the lamphouse, the projection lamp 61 the motor for the compressor unit C, and the drive motor M, each controlled by manually operated switches 99, 106, and 107 respectively.

A line 108 connected at junction 109 with the main line 101, and line 110 connected at junction 111, with main line 100 comprise a solenoid, or a secondary circuit. This solenoid circuit, can be cut off from the main circuit by opening switch R₂ of relay R, but since this relay is normally open, the solenoid circuit is normally alive. The solenoids 40, 40', 46, 53 and 91, previously described, are connected in parallel across the solenoid circuit, and connected in series with each is a micro-switch which is normally spring pressed to a closed position but is held open by a cam having notches in its periphery to allow its associated switch to close at prescribed intervals and for given durations.

In the drawings we have designated the switch in series with the solenoid 46 controlling the vacuum line as Sᵥ and the cam holding it open as Cᵥ; the switch in series with the solenoid 40 controlling the valve for pouring developer as Sd and the cam holding it open as controlling the valve for pouring the fixing solution as Sf and the cam holding it open as Cf; the switch in series with the solenoid 53 for raising the processing cup as Sc and the cam holding it open as Cc; and the switch in series with the solenoid 91 controlling the film advance as Sₐ and the cam for holding it open as Cₐ. As shown in Figs. 1 and 5 the five microswitches Sc, Sd, Sf, Sc, and Sₐ are mounted in a line in spaced relation along the base of the apparatus adjacent the cam shaft 96, and on which each of the cams Cc, Cd, Cf, Cc, and Cₐ are fixed to rotate therewith. Each micro-switch includes a control arm 112 which has a roller 113 and the end thereof engaging the periphery of the cam with which the switch is associated. As clearly shown in Fig. 12, each micro-switch is held open by its associated cam and each cam includes one or more notches which permits the closing of its associated switch in proper timed relation and for given intervals to effect the automatic processing of an exposed area of film and the advance of the same to the projection means.

The drive for the cam shaft includes a drive shaft 114 which is geared to the drive shaft 82 through a worm wheel 115 and a worm 116. The drive shaft 114 is, therefore, constantly driven so long as motor M is operating. The cam shaft 96 is connected to the drive shaft 114 through a one-revolution clutch 117 which is preferably of the same type as clutch 83 previously described. The driven member 118 of this clutch includes a notch or ratchet tooth (not shown) on its periphery which is adapted to be engaged at the end of each revolution by the nose of a pivoted pawl 120. This pawl 120 is connected to the plunger of a solenoid 121 which when momentarily energized pulls the pawl to a release position. The spring 122 of the solenoid plunger moves the pawl against the periphery of the driven member of the clutch so that it will engage and stop the same on the completion of a single revolution of the cam shaft.

It will thus be seen that during each revolution of the cam shaft 96 each of the five control cams thereon take over the automatic processing of an exposed area of film which includes the step of introducing the developer to the processing cup and allowing it to remain thereon for a given time, evacuating the developer from the cup, pouring the fixing solution into the cup, allowing it to remain therein for a given time, evacuating fixer from the cup, again pouring developer into the cup for rinsing purposes, allowing it to remain therein for a given time, evacuating developer from the cup and drying the film, lifting the cup and advancing the film, each in the order mentioned.

Figure 13:
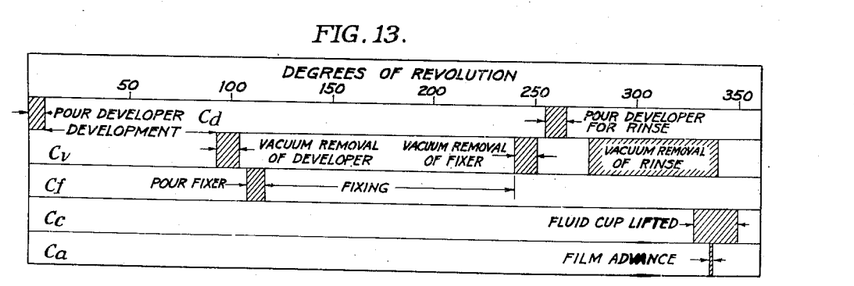
Fig. 13 is a cam timing chart for the apparatus.

In Fig. 13 the cam timing chart for this sequence of operations is shown with each of the cams shown extended along a line marked in degrees and the cam designation being indicated at the left of the chart. The hatched areas show the relative location of the notches in the several cams and their lengths in degrees which control the duration of energization of the solenoid controlled thereby. It will be noticed that the cam $C_d$ controlling the valve in the tube to the developer supply includes two spaced notches, because developer solution is introduced into the cup twice, during each processing operation. The cam $C_e$ controlling the valve in the vacuum line includes three spaced notches because the cup has to be evacuated three times, the last being the most extended in duration because it is at this step that the film is to be cleared of all superfluous liquid prior to being moved into the projector. The cams $C_f$, $C_c$, and $C_a$ each include only one notch apiece because during each processing step the fixing solution is introduced only once the cup is lifted only once and the film is advanced only once. The notch in cam $C_a$ controlling the film advance is only long enough to permit an impulse operation of the solenoid 91, because after the quarter turn clutch 83 is released the pawl 87 must be allowed to immediately return to its locking position to again stop the sprocket 80 after it has advanced the processed area of film into the film gate of the projector and has, at the same time, advanced a new area of film into exposure and processing position.

With the present arrangement, the complete processing cycle, including the film advance, takes approximately 13.5 seconds, or one revolution of the cam shaft 96 takes 13.5 seconds. Therefore, since the radar equipment under consideration has a 15-second sweep time, which is the exposure time of the present apparatus, then a previously exposed area is processed and the film is advanced in time to allow a new exposure to be started at the beginning of a new sweep of the radar screen. To this end, the solenoid circuit is controlled by a normally open switch 124 which is momentarily closed at the completion of each 360-degree sweep of the radar screen, or at the end of each exposure period. This can be accomplished in different ways, but we have chosen to show it done by means of a cam 125 which may be carried on the radar antenna to rotate therewith, see Fig. 12. When the cam 125 closes switch 124 momentarily the solenoid 121 is energized long enough to pull pawl from engagement with the driven member 118 of the one-revolution clutch 117 and thus release the cam shaft 96 for one revolution.

To permit threading of the apparatus, and the run off of film which would be fogged during this operation, it is desirable to speed up the advance of the film, or eliminate the 15-second delay involved in the use of the input signal from the radar equipment. To this end, the switch 124 is shunted by a line containing a normally open, but manually operable "steady-run" switch 126 which when held closed manually will cut out the exposure cycle of 15 seconds and speed up the film advance to a 13.5 second operation. During this time the "input signal" switch 127 in series with the switch 124 is opened and left open and is again closed to synchronize the operation of the apparatus with the radar equipment when it is ready to operate.

*Safety or supervisory circuit*

If for any reason the film should become flooded due to faulty operation of the processing apparatus then the processing part of the apparatus should be shut off and the vacuum line should be opened to clean up the solution from the film track. Also, the processing part of the apparatus should be automatically cut off when the end of the film approaches the processing cup for as soon as the film is exhausted there is nothing to close the bottom of the cup and any solution introduced thereinto would flow all over the film track.

To this end, the control circuit of the apparatus includes a safety or supervisory circuit which will cut the solenoid circuit, or all of the circuits controlling the processing steps, off the main circuit and the source of power. Referring to Fig. 12 this safety or supervisory circuit includes the secondary of a transformer 130 which is connected to the primary circuit, a flood switch 131, a film switch 132 and the coil of a relay R including three switches $R_1$, $R_2$, and $R_3$ which assume the position shown in Fig. 12 when switches 131 or 132 are open. When either one of the switches 131 or 132 closes, the coil of relay R is energized. This causes switch $R_1$ to close and a hold-in circuit for the coil of the relay is completed so that even if switches 131 or 132 again open the complete apparatus has to be manually shut down to reset the circuit to its normal operating condition. At the same time switch $R_2$ is thrown to its other pole and this cuts the solenoid circuit from the primary circuit and the source of power and causes a red pilot lamp 144 to light. When switch $R_3$ closes, this connects the solenoid 46 to the main primary circuit independently of its microswitch and this causes the valve in the vacuum line to open and stay open to clean up any flood which might have taken place on the film track.

As shown in Figs. 2 and 4, one contact of the flood switch comprises a metal feeler 133 which is slidably mounted in a casing 134 of insulating material which is mounted in a vertical position on the cover plate 18 of the film track just past the processing cup 20 in the direction of movement of the film. This metal feeler is forced downwardly by a coil spring 135 so that it presses against the emulsion surface of the film adjacent the line of perforations, one being shown at P in Fig. 4. This feeler is connected into the circuit by means of a wire 136 which is connected to a metal spring retaining cap 137 screwed onto the top of the casing and directly engaging the spring. The other contact of the flood switch is the base plate 117 of the film track 13. So long as no flood conditions exist, the plate 17 and the feeler 133 are separated by the film F which is an insulating medium and the switch is open. However, just as soon as a flood condition exists, the solution will fill the film perforations, and acting as an electrolyte will effectively connect the feeler 133 and the plate 17 to close the safety circuit and energize the coil of relay R.

As shown in Fig. 2, the film switch comprises a base plate 17 of the film track and a roller 138 mounted on the end of a pivoted arm 139 normally spring-pressed into engagement with the plate 17. The roller 138 extends through an opening 140 in the cover plate 18 of the film track and will ride on the surface of the film and be separated from plate 17 so long as there is film in the track. However, just as soon as the end of the film passes from under the roller 138 then this roller will drop down onto plate 17 and close the circuit.

It is believed that the operation of the apparatus will be clear from the above description, but for the sake of review, a brief resume of the actual steps necessary to set the apparatus into operation will now be set forth. The solution heater may be turned on without turning on the main switch which supplies power to most of the circuits as well as the compressor motor. It is well to do this before starting to load the apparatus with film, as it takes a few minutes for the heat exchanger block to come up to temperature. When the green pilot light, in parallel with the heaters, turns off, then on and off intermittently, the block is up to temperature.

The film is loaded in the camera, emulsion side up as it comes from the film retort. About 12 inches of film is pulled out of the retort and the squared end of the film is crimped down slightly to facilitate threading. The camera may be threaded without removing the cover plate from the film track by pushing film through, raising the developing cup by pushing down on the outer end of the cup arm, and then threading under the advancing sprocket guide rollers.

It requires about 10 development cycles to clear the fogged film out of the camera after the door of the housing is closed. This may be done by closing the "steady-run" switch 126, or by tying back the cam shaft solenoid pawl 120. Run in this manner, one cycle occurs about every 13.5 seconds. To synchronize with radar receiver, the "steady-run" switch 126 is opened and switch 127 is closed. Now one development cycle will occur every 30 seconds because the cycle will include a 15-second exposure period, or a complete 360-degree sweep of the radar screen, but all subsequent exposures, processing steps, and projecting steps will be completely automatic.

While we have shown this automatic recording and projecting apparatus in connection with a radar installation, it is pointed out that this is only one specific application of many which the apparatus is adapted for. The apparatus could be used to record and project in a short time an enlarged image of any subject or phenomenon which could not be viewed conveniently because of small size, inaccessibility, and/or falling off of the image forming the subject. Therefore, the possible uses of this apparatus include: (1) Recordak office installation for quick processing and rapid selection, (2) X-ray examination of parts in production, replacing fluoroscopy, (3) quick recordings of cathode ray oscilloscope data, and (4) quick examination of light-sensitive film coating.

In connection with the last-mentioned possible application of this apparatus, it is pointed out that the physical characteristics of light-sensitive coatings on film are critical and it is now common practice to make infra red exposures in the dark coating rooms of the coatings as they leave the coating machines in order to check the operation of the coating machines. Such exposures have to be taken to the darkroom and processed in the conventional manner, and it is a matter of minutes before the picture is ready for examination. If it is then found that the coating is unsatisfactory and that an adjustment of the machine is required to correct the difficulty, then all of the film which has been run through in the meantime has to be wasted. With the present apparatus, the taking lens could be focused on the coating path at all times and an exposure could be made at regular intervals and immediately processed to tell the story in about 15 seconds, rather than a matter of minutes. Consequently, a poor coating could be detected and corrected before any appreciable quantity of film had run through the machine and had to be thrown away. With such an apparatus, the switch 124 could be controlled by a cam operating at regular cycles and acting to turn on the infra red light to make the exposure.

In most applications of this apparatus, other than the radar use disclosed, or where the subject as a whole is present at one time and can be instantaneously exposed, the exposure will be controlled by a conventional shutter in covering relation with the taking lens, or by a set of lights which will be turned on and off the subject to effect the exposure. In this instance, the exposure will be instigated by the positioning of a fresh film into position in the camera, or by the positioning of the copy in the field of the lens, and the processing step will be instigated at a given time after the operation of the shutter.

Figure 14:
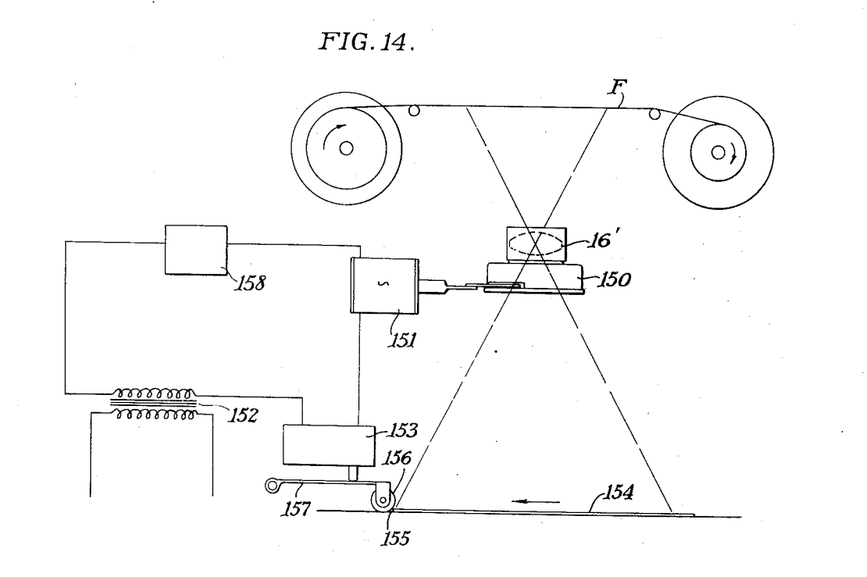
Fig. 14 is a schematic illustration of a modification in the control circuit of the apparatus if the exposure of the film is to be controlled by a shutter, as it could be in the present application.

In Fig. 14 we have shown what modification of the apparatus would be necessary to adapt the same for the photographing, processing, and projecting of an enlarged image of a copy. The taking lens 16' is shown equipped with a conventional between-the-lens type of shutter 150 of the automatic type which is adapted to be tripped by a solenoid 151. The power to operate this solenoid may emanate from the secondary of a transformer 152 connected to the primary circuit of the apparatus, or a separate source of power may be provided. The solenoid circuit may include a normally open switch 153 shown as a microswitch, which is adapted to be closed by the leading end of the copy being fed into the field of the lens by any suitable means, not shown. In Fig. 14 a copy 154 is fed into the photographing field in the direction indicated by the arrow and when the leading edge 155 thereof strikes the roller 156 on the end of a pivoted arm 157, the arm is raised to close the micro switch and the solenoid 151 is energized and trips the shutter. At the same time the solenoid is energized to trip the shutter, a self-setting timer 158 of the conventional type, and connected in the solenoid circuit, is energized and the actuating member thereof would close switch 124 of the apparatus to start the processing cycle. It will be understood that the shutter will be set for a given exposure speed and the timer will be set in accordance therewith to start the processing step immediately upon the completion of the exposure. If the lighting conditions are such that the exposure could be made instantaneously (e. g. 1/100 sec. or faster) then the switch 124 could be closed simultaneously with the tripping of the shutter by the solenoid 151, since the lag in the operation of the parts of the processing apparatus and their control circuit would probably be greater than the exposure period. This would eliminate the need for the timer 158 or its equivalent. It will thus be appreciated that the exposure time and/or time of starting the processing step could be controlled in any number of ways to make the apparatus adapted for a wide number of uses other than the radar application disclosed for purposes of setting forth the invention.

Although we have shown and described certain specific embodiments of our invention, we are aware that many modifications thereof are possible. Our invention, therefore, is not to be limited to the precise details and construction shown and described, but is intended to cover all modifications.

Having thus described our invention, what we claim as new and desire to secure by Letters Patent of the United States is:

1. Film processing apparatus comprising a processing cup having an open-end of a shape and size to encircle an area of a light-sensitive surface of film which it is desired to process, the open-end of said cup terminating in a lip which is adapted to engage the surface of the film to form a liquid-tight joint therewith, a wall fixed to and spaced from the wall of said cup to provide a closed chamber extending around said cup, the wall of said chamber provided with an orifice placing the interior of said cup in communication with said chamber, said orifice extending around the open end of said cup and disposed so that the restricted end thereof enters the interior of the cup adjacent the lip thereof, and a port through the outside wall of said cup and in communication with said chamber to permit the introduction, or removal of fluid into and from said chamber, respectively.

2. A film processing apparatus according to claim 1 in which said lip is separate from the cup proper, and means for detachably connecting said lip to the wall of said cup.

3. A film processing apparatus according to claim 1 in which said orifice extends downwardly at an angle to the open end of said cup and toward the center of the cup, and the restricted end thereof lies immediately adjacent the film engaging portion of said lip of the cup.

4. A film processing apparatus according to claim 1 in which said orifice extends downwardly at an angle to the open end of said cup and toward the center of the cup, said lip having an inclined surface forming one wall of said orifice and terminating in a knife edge with a plane surface on said lip which is adapted to engage the film surface.

5. Film processing apparatus comprising a double walled cup open at one end, said walls being in spaced relation to provide a closed chamber through which fluid is adapted to pass in moving between the interior and exterior of said cup; the open end of said cup terminating in a lip adapted to engage the sensitive surface of a film and form a liquid-tight joint therewith, and adapted to bound a given area of the film surface which it is desired to process; the wall of said chamber being provided with an orifice placing the interior of said cup in communication with said chamber, said orifice inclined downwardly and toward the center of the open end of said cup and having its restricted end located adjacent to the film engaging portion of said lip, and a port in the outer wall of said cup at a point removed from said orifice to permit the introduction or removal of a fluid into and from said chamber, respectively.

6. Film processing apparatus according to claim 5 in which said lip constitutes a part of the outer wall of said cup and the inner surface thereof constitutes one wall of said orifice the lower end of said inner wall being spaced from the inner surface of said lip and constituting the other wall of said orifice.

7. Film processing apparatus according to claim 5 in which said lip is separate from the cup and adapted to be detachably connected to the lower end of the outer wall thereof, said lip including an inner inclined surface which constitutes one wall of said orifice, the other wall of said orifice being formed by an inclined end on the inner wall of said cup which is spaced from said inner surface of said lip.

8. Film processing apparatus according to claim 5, and including means separate from said chamber for introducing processing solutions into the interior of said cup.

9. Film processing apparatus according to claim 5 in which the interior of said cup is open at the other end to permit the introduction and/or removal of a solution relative to the interior of said cup.

10. Film processing apparatus according to claim 5 in which the interior of said cup is open at the other end and said port is adapted to be connected to a source of air under pressure; means for introducing quantities of processing solutions into the interior of said cup; and means for removing said solutions from said cup and the surface of the film associated therewith, said means including a tube having one end extending into the open end of said cup and terminating at a point just short of the plane of the film engaging surfaces of said lip and located substantially in the center of said cup; said tube adapted to be connected with a vacuum for removing the solutions as they are forced to the central area of the cup by air entering the same through said orifice.

11. In an apparatus for processing the exposed area of film the combination of an open-ended processing cup; means for moving said cup and film into and out of operative relationship wherein the emulsion surface of said film is in liquid-tight engagement with the bottom end of said cup and the exposed area of said surface is confined by said cup; reservoirs for the individual processing solutions; means for conducting measured quantities of each of said solutions from said reservoirs into the open top of said cup and including a heat-exchanger which is adapted to raise and hold said measured volumes of solutions to an elevated temperature immediately prior to their introduction into said cup.

12. In an apparatus for processing the exposed area of film the combination of an open-ended processing cup; means for moving said cup and film into and out of operative relationship wherein the emulsion surface of said film is in liquid-tight engagement with the bottom end of said cup and the exposed area of said surface is confined by said cup; reservoirs for the individual processing solutions; means for conducting measured quantities of each of said solutions from said reservoirs into the open top of said cup and including a heat-exchanger which is adapted to raise and hold said measured volumes of solutions to an elevated temperature immediately prior to their introduction into said cup, and means for introducing a measured quantity of said solutions into that portion of said conducting means including said heat-exchanger and causing the displacement of the volume of solution previously introduced into said cup.

13. In an apparatus for processing the exposed area of film the combination of an open-ended processing cup; means for moving said cup and film into and out of operative relationship wherein the emulsion surface of said film is in liquid-tight engagement with the bottom end of said cup and the exposed area of said surface is confined by said cup; reservoirs for the individual processing solutions; means for conducting measured quantities of each of said solutions from said reservoirs into the open top of said cup and including a heat-exchanger which is adapted to raise and hold said measured volumes of solutions to an elevated temperature immediately prior to their introduction into said cup, and means for creating a difference of pressure within the cup and localizing the effect of said difference in pressure at the bottom of the cup and adjacent the film surface to rapidly evacuate said cup and remove the solution from the cup and the surface of the film.

CLIFTON M. TUTTLE.
CHARLES J. KUNZ.

REFERENCES CITED

The following references are of record in the file of this patent:

UNITED STATES PATENTS

| Number | Name | Date |
|---|---|---|
| 989,839 | Fowler | Apr. 18, 1918 |
| 1,728,361 | Pifer | Sept. 17, 1929 |
| 1,825,126 | Powers | Sept. 29, 1931 |
| 1,889,425 | Sorensen | Nov. 29, 1932 |
| 1,904,551 | Smith | Apr. 18, 1933 |
| 1,928,235 | Taylor | Sept. 26, 1933 |
| 1,964,257 | Gilmore | June 26, 1934 |
| 2,055,215 | Dreyer | Sept. 22, 1936 |
| 2,067,933 | Krupa | Jan. 19, 1937 |
| 2,140,438 | Webster | Dec. 13, 1938 |
| 2,203,382 | Davis | June 4, 1940 |
| 2,218,656 | Pifer | Oct. 22, 1940 |
| 2,221,055 | Lundegardh | Nov. 12, 1940 |
| 2,327,733 | Moore | Aug. 24, 1943 |

FOREIGN PATENTS

| Number | Country | Date |
|---|---|---|
| 615,249 | France | Oct. 4, 1926 |
| 589,453 | Germany | Dec. 1933 |

Certificate of Correction

Patent No. 2,476,007                                                                   July 12, 1949

CLIFTON M. TUTTLE ET AL.

It is hereby certified that errors appear in the printed specification of the above numbered patent requiring correction as follows:

Column 8, line 6, for the words "needles of which extend through" read *supporting bracket 35 fixed to*; column 12, line 44, before "controlling" insert $C_4$; *the switch in series with the solenoid 40'*;

and that the said Letters Patent should be read with these corrections therein that the same may conform to the record of the case in the Patent Office.

Signed and sealed this 20th day of December, A. D. 1949.

[SEAL]

THOMAS F. MURPHY,
                                                              *Assistant Commissioner of Patents.*